INVENTORS.
HAROLD J. SIEKMANN
AND WALTER R. MEYER
BY

ATTORNEY.

May 13, 1952 H. J. SIEKMANN ET AL 2,596,511
CRANKSHAFT LATHE TOOL FEEDING MECHANISM
Filed Oct. 30, 1948 7 Sheets-Sheet 3

INVENTORS.
HAROLD J. SIEKMANN
AND WALTER R. MEYER
BY
Willard L. Groene
ATTORNEY.

May 13, 1952     H. J. SIEKMANN ET AL     2,596,511
CRANKSHAFT LATHE TOOL FEEDING MECHANISM
Filed Oct. 30, 1948     7 Sheets-Sheet 4

INVENTORS.
HAROLD J. SIEKMANN
AND WALTER R. MEYER
BY
Willard S. Groene
ATTORNEY.

INVENTORS.
HAROLD J. SIEKMANN
AND WALTER R. MEYER
BY
ATTORNEY.

May 13, 1952     H. J. SIEKMANN ET AL     2,596,511
CRANKSHAFT LATHE TOOL FEEDING MECHANISM
Filed Oct. 30, 1948     7 Sheets-Sheet 6

INVENTORS.
HAROLD J. SIEKMANN
AND WALTER R. MEYER
BY
Willard S. Groene
ATTORNEY.

May 13, 1952   H. J. SIEKMANN ET AL   2,596,511
CRANKSHAFT LATHE TOOL FEEDING MECHANISM
Filed Oct. 30, 1948   7 Sheets-Sheet 7
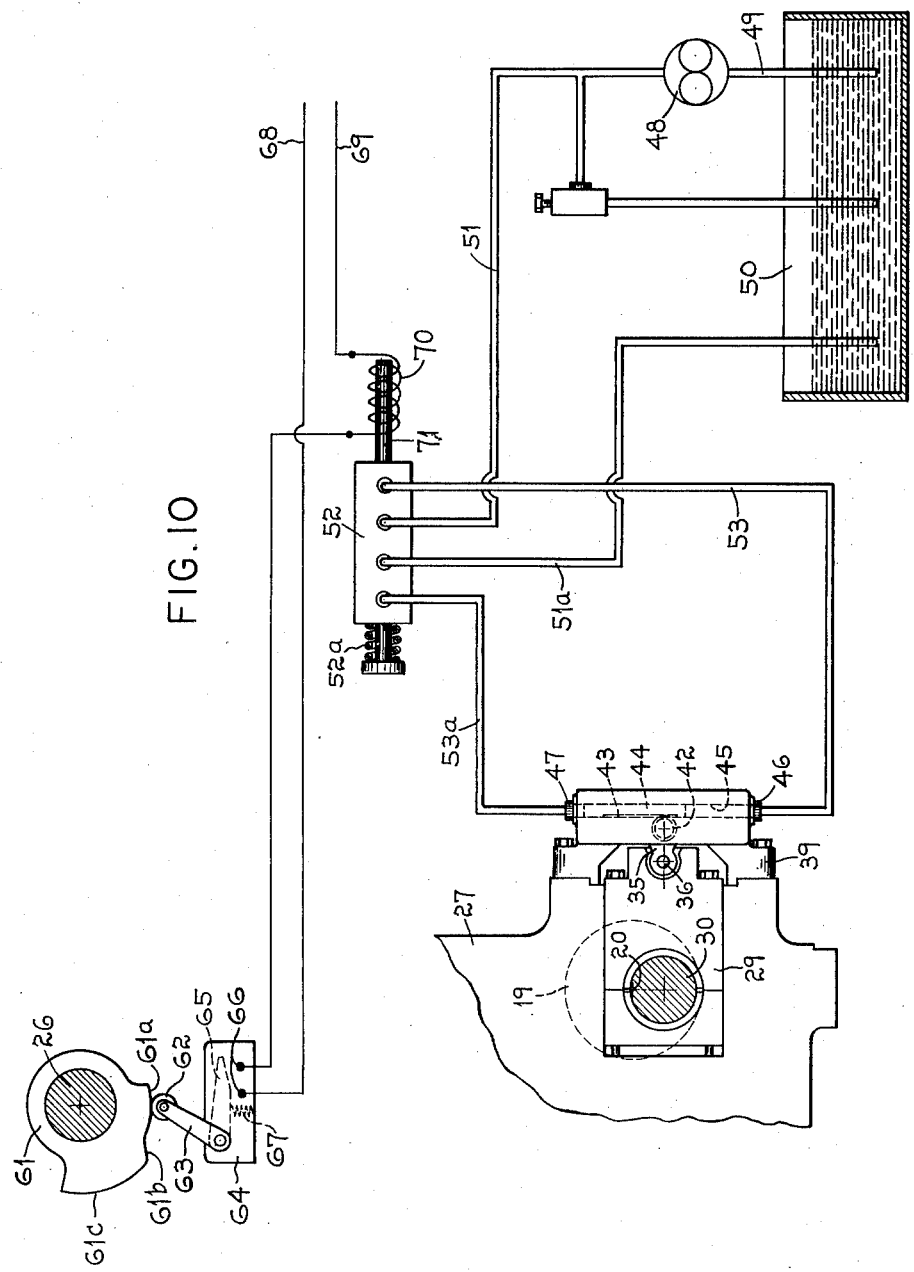
INVENTORS.
HAROLD J. SIEKMANN
AND WALTER R. MEYER
BY
Willard S. Groene
ATTORNEY.

Patented May 13, 1952

2,596,511

UNITED STATES PATENT OFFICE 2,596,511

CRANKSHAFT LATHE TOOL FEEDING MECHANISM

Harold J. Siekmann and Walter R. Meyer, Cincinnati, Ohio, assignors to The R. K. Le Blond Machine Tool Co., Cincinnati, Ohio, a corporation of Delaware Application October 30, 1948, Serial No. 57,578

3 Claims. (Cl. 82—9)

This invention pertains to improvements in tool feeding mechanism for crankshaft lathes and is particularly directed to an improved multiple cut tool feeding arrangement for an orbital crankpin turning lathe.

One of the objects of this invention is to provide an improved tool feeding arrangement in which a series of different cutting tools may be successively presented to a workpiece during a continuous relative feeding movement of the cutting tools and the work.

Another object of this invention is to provide in an orbital lathe for turning the crankpin portions of a crankshaft, an arrangement for shifting the orbital tool carrier relative to a master crankshaft of the orbital lathe so as to successively present different sets of tools for cutting the faces or cheeks of the flanges and then the crankpin diameters during a continuous feeding movement of the tool carriers and work.

And it is a further object of this invention to provide in an orbital lathe, means for first presenting a set of cheeking tools to complete the machining of the webs of the crankshaft and then to automatically present another set of crankpin turning tools for completing the crankpin portions of the crankshaft to thus complete, in a single chucking of the crankshaft in the lathe, all of the crankpin portions of the crankshaft.

It is also an object of this invention to provide in an orbital lathe, having an orbitally moving tool carrier mounted on a pair of master crankshafts, a means for shifting the carrier relative to one of the master crankshafts so as to present a plurality of different sets of cutting tools, fixed on the carrier, into cutting position for operating on different portions of a work piece in the lathe.

Further features and advantages of this invention will appear from the following detailed description of the drawings in which:

Figure 10 is a circuit diagram of the control mechanism for automatically shifting the tool carrier during the cutting cycle for presenting various cutting tools to the work.

Figure 1:
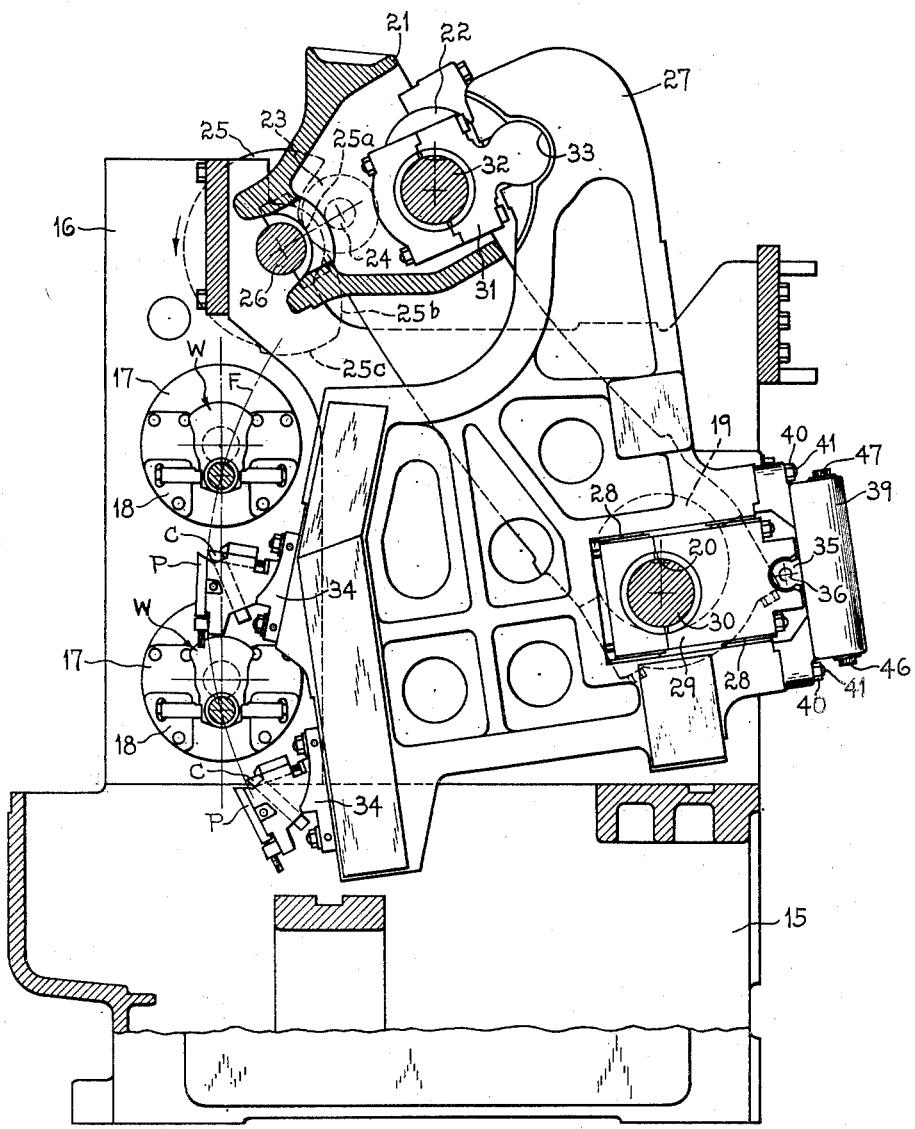
Figure 1 is a vertical transverse view through a typical orbital crankpin turning lathe incorporating the features of this invention, showing the orbital tool carrier in the starting position of a cutting cycle with the cheeking tools in cutting position to operate on the crankshaft.

For illustrative purposes this invention is shown applied to an orbital lathe, such as shown and described in the Patent 2,138,964 of William F. Groene, issued December 6, 1938, having a base 15 upon which is fixed the housing 16 which in turn carries the rotatable work spindles 17 having the chucks 18 which support and rotate the crankshafts W which are to be machined in the lathe.

At the rear of the housing 16 is journaled the lower master crankshaft 19 for rotation about an axis 20. A feeding cradle 21 is pivotally mounted to rock about the axis 20 of the lower master crankshaft 19. The upper master crankshaft 22 is carried in the top of the feeding cradle. A roller 23 journaled on a pin 24 carried in the cradle 21 rests against the periphery of the feeding cam 25 carried on a shaft 26 in the housing 16 so that rotation of the cam 25 effects rocking of the cradle 21 and the upper master crankshaft 22 about the axis 20 of the lower master crankshaft 19 in a manner as fully set forth in the aforementioned Patent 2,138,964.

The orbitally moving tool carrier 27 is slidably mounted by suitable guideways 28 and guide pins 28a on a block 29 which is journaled on a crankpin 30 of the lower master crankshaft 19 while the upper portion of the tool carrier 27 is connected through a link 31 journaled on the crankpin 32 of the upper master crankshaft 22 and pivotally connected at 33 to the tool carrier. On the front of the tool carrier are fixed the tool blocks 34 in which are mounted the cheeking tools C and the crankpin turning tools P.

Figure 4:
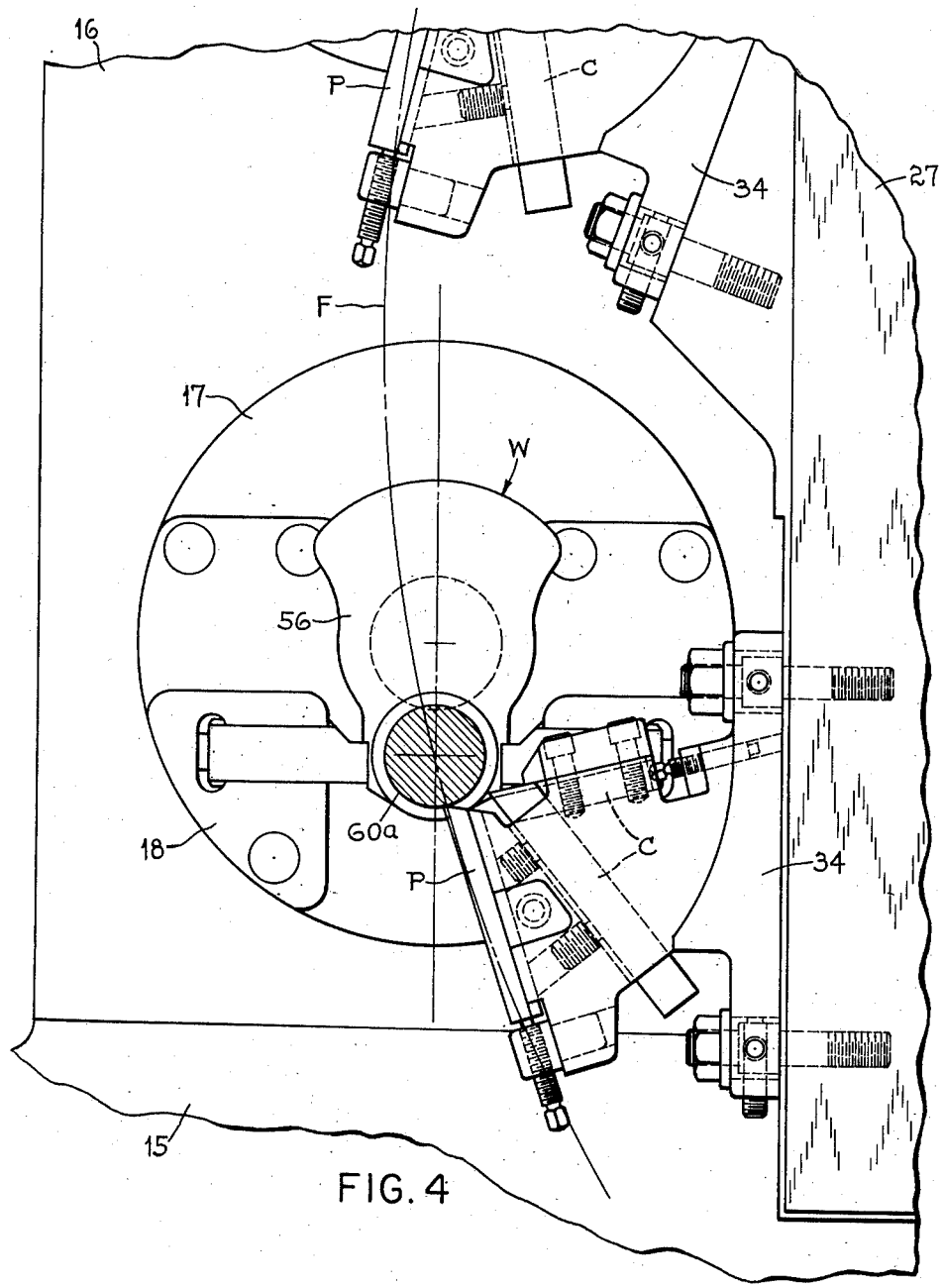
Figure 4 is an enlarged fragmentary view of a portion of Figure 3 particularly showing the relationship of the tools to the work at the end of the cutting cycle.
Figure 9:
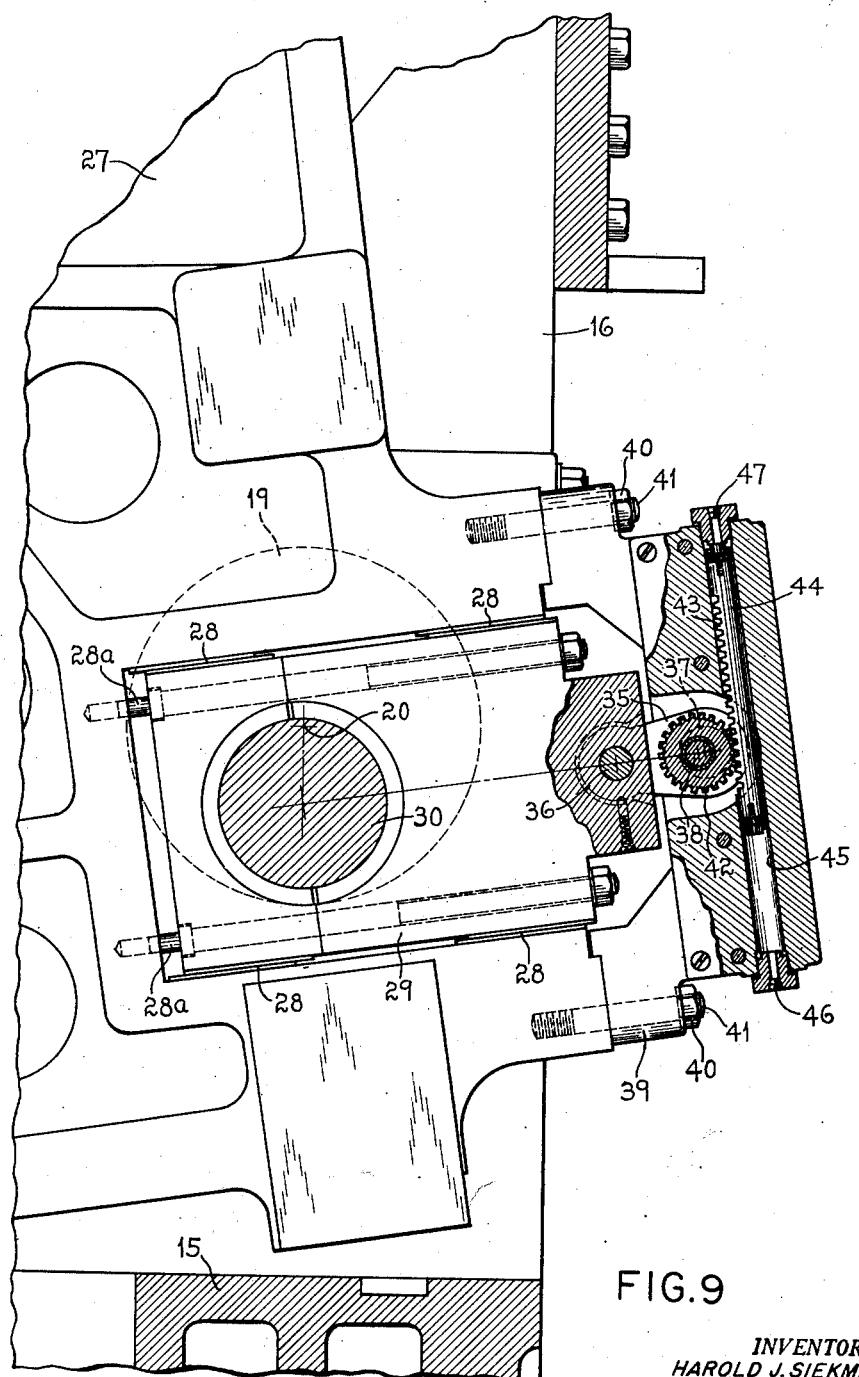
Figure 9 is an enlarged fragmentary view of a portion of the rear of the tool carrier, particularly showing the mechanism for shifting the carrier relative to one of the master crankshafts.

Referring particularly to Figure 9, there is shown the mechanism for effecting relative shifting movement between the tool carrier 27 and the block 29, that is, effecting the relative movement between the tool carrier 27 and the lower master crankshaft 19 for presenting either the cheeking tools C or the crankpin turning tools P on the line of arcuate feeding movement F, Figure 4. This mechanism comprises a link 35, Figure 9, pivotally connected by a pin 36 to the rear portion of the block 29 and which link is journaled on the eccentric portion 37 of the eccentric rock shaft 38 journaled in the bracket 39 fixed to the rear portion of the tool carrier 27 by suitable nuts 40 on the studs 41. A gear 42 is fixed on the eccentric shaft 38 which is engaged by a rack 43 formed on a fluid pressure piston 44 which operates in a cylinder bore 45 formed in the bracket 39. Suitable fluid pressure supply openings 46 and 47 are provided for the cylinder 45.

Figure 5:
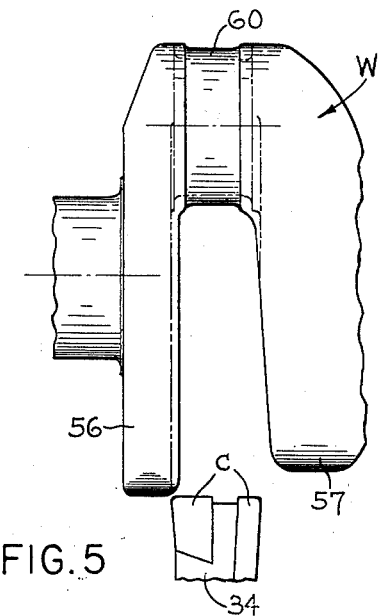
Figure 5 is a diagrammatic view showing the relative position of the cheeking tools and the crankshaft to be machined at the beginning of the cutting cycle as shown in Figure 1.

The operation of the machine is as follows: With the work spindles 17 and master crankshafts 19 and 22 rotating in synchronism as set forth in the above mentioned Patent 2,138,964, the feeding cycle begins with the roller 23 of the cradle on the lowest portion 25a of the feed cam 25 so that the cradle and tool carrier are in the rocked position as shown in Figure 1. At this time fluid pressure from a fluid pressure pump 48, Figure 10, receiving a supply of fluid through a suction line 49 from a fluid reservoir 50 and supplying pressure to the line 51 connected to the control valve 52 which is normally biased by a spring 52a so that fluid pressure is conducted through a line 53 to the supply opening 46 of the cylinder bore 45 and connecting discharge from the opening 47 through line 53a and the valve 52 to the drain line 51a for return of fluid to the reservoir 50 to move the piston 44 upwardly, Figure 9, so as to position the eccentric 37 to cause the tool carrier to be moved relatively forward with respect to the lower master crankshaft 19. This positions the cheeking tools on the line of feeding movement F of the cutting tools when in operative position. At this time at the beginning of the cutting cycle, the cheeking tools C are positioned relative to the crankshaft to be machined as shown in Figure 5.

Figure 2:
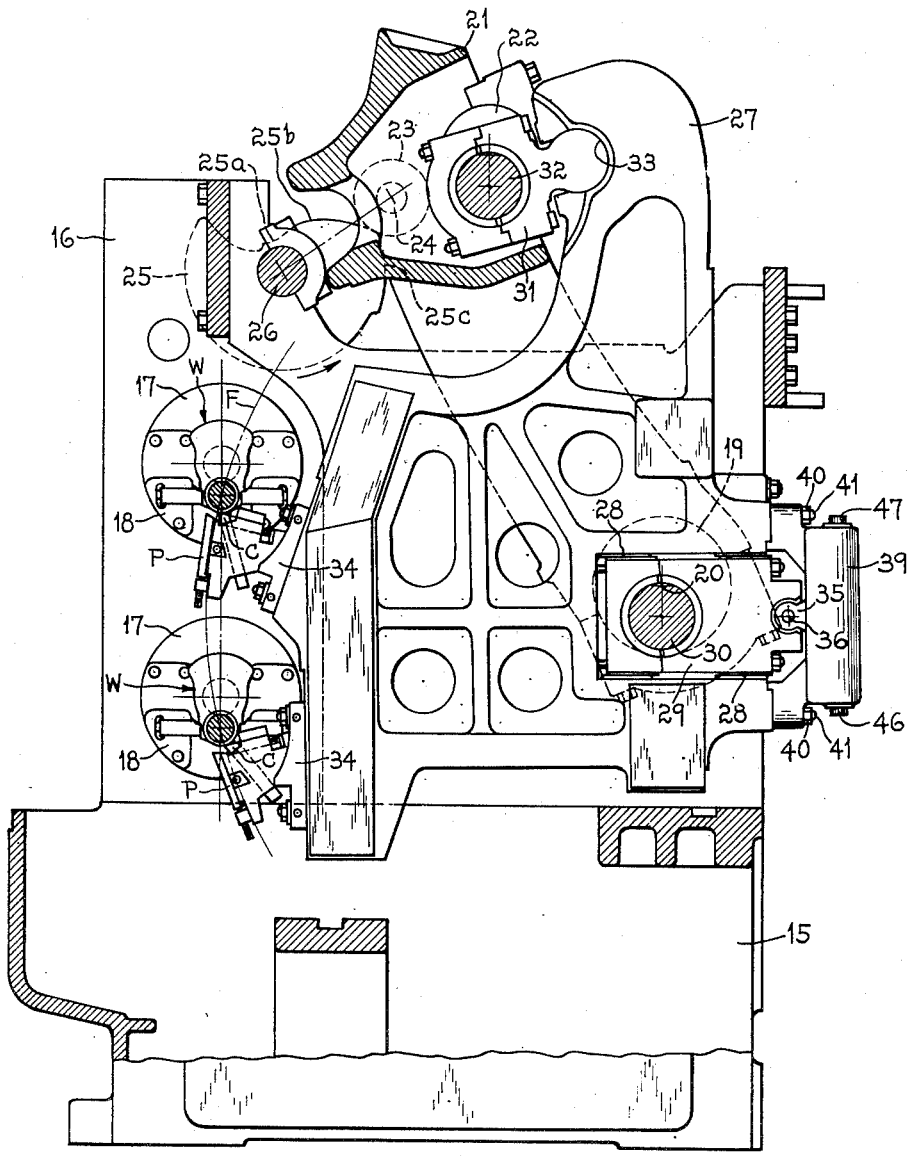
Figure 2 is a view similar to Figure 1, but showing the tool carrier in position at the completion of the cutting by the cheeking tools and just before the presentation of the crankpin turning tools to cutting position.
Figure 6:
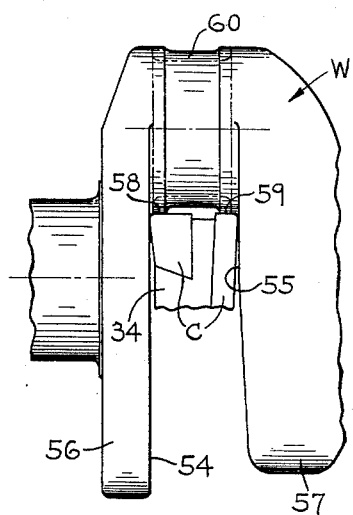
Figure 6 is a diagrammatic view showing the relationship of the cheeking tools to the work crankshaft at the completion of the cheeking tool cutting operation as shown in Figure 2.

As the feeding movement continues, the cam 25 rotates counter-clockwise, Figure 2, causing the roller 23 to ride up the cam rise 25b to rock the tool carrier and the tools upwardly. During this movement the cheeking tools C advance from the position in Figure 5 to the end of their cutting movement as shown in Figures 2 and 6 to complete the machining of the faces or cheeks 54 and 55 of the respective crankshaft webs 56 and 57 and to complete the fillet diameters 58 and 59 adjacent to the rough crankpin diameter 60. Also during this cheeking tool movement a limit switch cam 61, Figure 10, fixed on the feed cam shaft 26 rotates with its low portion 61a in contact with the limit switch roller 62 of the limit switch 64 which has a contact arm 65 normally held in open condition from the contacts 66 by the compression spring 67.

Figure 7:
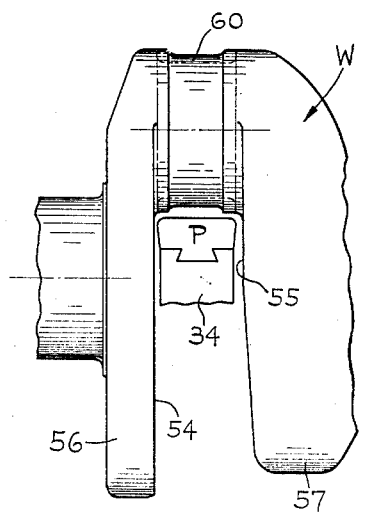
Figure 7 is a diagrammatic view showing the relative position of the crankpin turning tools at the beginning of the crankpin turning operation of the work piece.

At the conclusion of the cutting operation by the cheeking tools C, continued rotation of the feed cam 25 and the cam shaft 26 brings the rise portion 61b of the limit switch cam 61 into engagement with the limit switch roller 62 to bring the roller up on top of the high portion 61c of the cam 61 to thus close the contacts 66 which are connected in series with the electric supply lines 68 and 69 and the operating solenoid 70 for the plunger 71 of the control valve 52. The solenoid is thus energized to move the valve plunger 71 against the bias spring 52a so as to now connect pressure from the line 51 to the line 53a while connecting the line 53 to the drain line 51a. This causes the piston 44 to move downwardly, Figure 9, so as to rock the eccentric 37 to shift the tool carrier 27 rearwardly relative to the lower master crankshaft to bring the crankpin turning tools P into the line of feeding movement F while at the same time withdrawing the cheeking tools C from cutting position. The crankpin cutting tools now assume the position at the beginning of their cutting operation as shown in Figure 7.

Figure 3:
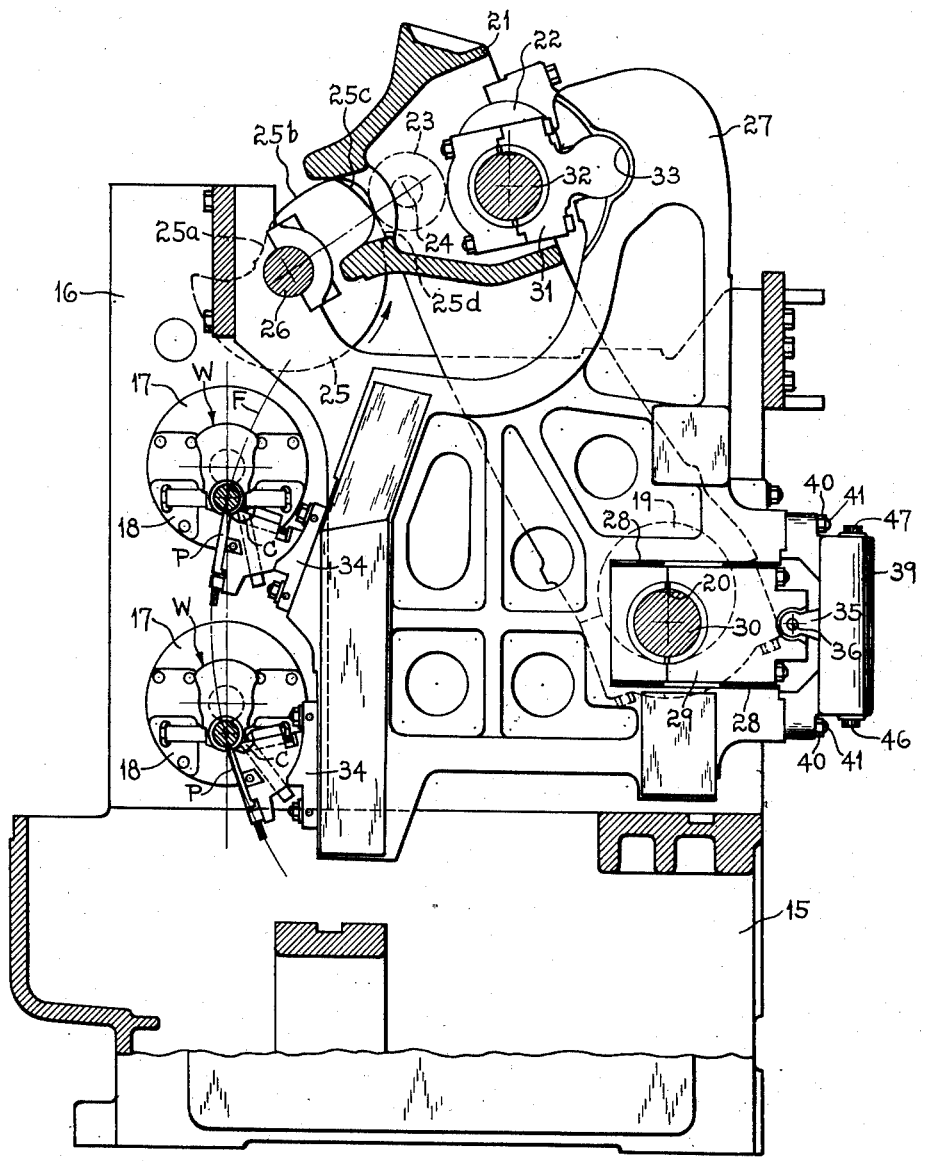
Figure 3 is a view similar to Figures 1 and 2, but showing the position of the tool carrier at the end of the cutting cycle with the crankpin turning tools fed into depth on the crankpins.
Figure 8:
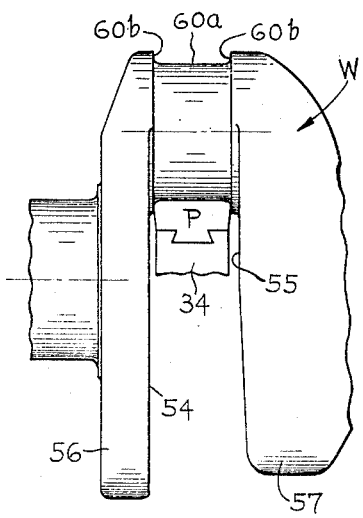
Fig. 8 is a diagrammatic view showing the relative position of the crankpin turning tools at the completion of the cutting cycle as shown in Figure 3.

The feed cam 25 continues to rotate causing the roller 23 to ride up the cam rise portion 26c, which portion is of less steepness than the portion 25b in order to provide a finer feed rate for the crankpin turning operation than the much coarser rate that can be used in doing the cheeking operating on the sides of the webs. This movement continues until the crankpin turning tools move from the position shown in Figure 7 to the completion of the feeding cycle as shown in Figures 3 and 8, at which point the crankpin turning tools are held in dwell position by the concentric portion 25d on the feed cam 25 to precisely size and finish the crankpin diameter 60a and fillets 60b.

At the conclusion of the dwell of the crankpin tools on the crankpins, the feed cam 25 is reversed in rotation to allow the cradle 21 to swing back to the position shown in Figure 1 for the beginning of another cutting cycle. During this return movement the limit switch roller 62 again drops down on the low portion of the limit switch cam 61 to de-energize the solenoid 70. This allows the valve spring to restore the valve plunger 71 to biased position to again connect the pressure to the supply opening 46 which causes the tool carrier to be moved forwardly to again bring the cheeking tools into cutting position for the beginning of the next cutting cycle.

There has thus been provided a crankshaft lathe tool feeding mechanism in which a series of different cutting tools are automatically successively presented to the work crankshaft during the continuous feeding movement of the orbitally moving tool carrier of the crankshaft lathe.

Having thus fully set forth and described this invention what is claimed and desired to be secured by United States Letters Patent is:

1. In an orbital crankshaft lathe having a tool carrier mounted on the crankpins of a pair of master crankshafts, differently positioned cutting tools fixed on said tool carrier, means for shifting said tool carrier relative to one of said master crankshafts to present each of said cutting tools into an operative cutting position comprising, a block journaled on a crankpin of one of said master crankshafts, guideways on said block slidably supporting said tool carrier, an eccentric shaft supported by said tool carrier, a link inter-connecting said eccentric shaft and said block, and fluid pressure actuating means carried on said tool carrier connected to rock said eccentric shaft to relatively move said block and tool carrier.

2. In an orbital crankshaft lathe having a tool carrier mounted on the crankpins of a pair of master crankshafts, differently positioned cutting tools fixed on said tool carrier, means for shifting said tool carrier relative to one of said master crankshafts to present each of said cutting tools into an operative cutting position comprising, a block journaled on a crankpin of one of said master crankshafts, guideways on said block slidably supporting said tool carrier, an eccentric shaft supported by said tool carrier, a link inter-connecting said eccentric shaft and said block, and fluid pressure actuating means carried on said tool carrier connected to rock said eccentric shaft to relatively move said block and tool carrier, feeding means for effecting a relative feeding movement between said tool carrier and a work spindle of said lathe, a source of fluid pressure, a control valve inter-connected between said source of fluid pressure and said fluid pressure actuating means operable to control reciprocation of said fluid pressure means to reversibly rock said eccentric shaft, and electric control means operated by the position of said feeding means for actuating said valve at a predetermined position of feeding movement of the tool carrier and said work spindle.

3. In an orbital lathe having a frame, a work spindle journaled for rotation in said frame, a lower master crankshaft journaled in said frame, a shifting means pivotally journaled on said lower master crankshaft, a feeding cradle pivotally mounted on said frame for swinging movement about the axis of said lower master crankshaft, an upper master crankshaft, a tool carrier having the upper end pivotally journaled on a crank pin of said upper master crankshaft and the lower end slidably mounted on said shifting means on said lower master crankshaft, a plurality of cutting tools fixed on said tool carrier in different operative positions relative to a line of feeding movement, means to actuate said shifting means to move said tool carrier about a crank pin of said upper master crankshaft to present each of said cutting tools successively in operative position on said line of feeding movement to perform a machining operation on a workpiece in said work spindle, means for moving said cradle in feeding movement, and control means governed by the position of said last mentioned means to render said means to actuate said shifting means operative for swinging said tool carrier relative to a crank pin of said upper master crankshaft.

HAROLD J. SIEKMANN.
WALTER R. MEYER.

REFERENCES CITED

The following references are of record in the file of this patent:

UNITED STATES PATENTS

| Number | Name | Date |
|---|---|---|
| 2,148,293 | Groene | Feb. 21, 1939 |
| 2,232,324 | Groene | Feb. 18, 1941 |